United States Patent
York et al.

(10) Patent No.: US 10,352,223 B2
(45) Date of Patent: Jul. 16, 2019

(54) METHOD FOR COLD START EMISSIONS DIAGNOSTIC

(71) Applicant: GM Global Technology Operations LLC, Detroit, MI (US)

(72) Inventors: Gregory J. York, Fenton, MI (US); Vijay A. Ramappan, Novi, MI (US); Zhijian J. Wu, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 30 days.

(21) Appl. No.: 15/698,093

(22) Filed: Sep. 7, 2017

(65) Prior Publication Data
US 2019/0072019 A1  Mar. 7, 2019

(51) Int. Cl.
*F01N 3/20* (2006.01)
*F01N 9/00* (2006.01)
*F01N 11/00* (2006.01)

(52) U.S. Cl.
CPC .......... *F01N 9/005* (2013.01); *F01N 3/2006* (2013.01); *F01N 11/00* (2013.01); *F01N 2900/08* (2013.01); *F01N 2900/1626* (2013.01)

(58) Field of Classification Search
CPC ........ F01N 11/00; F01N 9/005; F01N 3/2006; F01N 2900/1626; F01N 2900/08
See application file for complete search history.

(56) References Cited

U.S. PATENT DOCUMENTS

| | | | |
|---|---|---|---|
| 5,787,705 A | 8/1998 | Thoreson et al. | |
| 2015/0059697 A1* | 3/2015 | Iijima | F02D 41/024 123/406.53 |

* cited by examiner

*Primary Examiner* — Brandon D Lee

(57) ABSTRACT

A method for cold start emissions diagnostic of a catalytic treatment device of an internal combustion engine includes determining a torque reserve; determining a catalyst light off (CLO) state; integrating the total torque reserve over a time period established by the CLO state; determining if a value from the integration exceeds an integration threshold; and if the value from the integration exceeds the integration threshold, indicating that the cold start emissions diagnostic is positive.

18 Claims, 1 Drawing Sheet

METHOD FOR COLD START EMISSIONS DIAGNOSTIC

INTRODUCTION

The present disclosure relates to motor vehicle diagnostics. More specifically, the present disclosure relates to emissions diagnostics during cold starts.

Catalytic treatment devices, commonly called catalytic converters, are centrally important in automotive internal combustion engine emissions control. When catalytically active, catalytic converters significantly reduce engine emissions, such that emissions levels after treatment by an active catalytic converter may be substantially immeasurable. When a converter is substantially catalytically inactive, however, the emissions levels out of the converter may be substantial. The temperature of the catalyst of a catalytic converter must be elevated significantly following an engine coldstart before the converter becomes substantially catalytically active. A catalyst may be defined as being at a "light-off" condition when it is sufficiently catalytically active to oxidize fifty percent of a reasonable volume of engine hydrocarbons passing therethrough. A significant effort is made to rapidly elevate catalyst temperature to a temperature supporting light-off following an engine cold start. Proper catalytic converter functioning is required for emissions minimization. Accordingly, any deterioration in the operability of a catalytic converter must be diagnosed and rapidly treated to minimize emissions. Existing catalytic converter light off strategies rely on elevated idle speed accompanied with retarded combustion phasing to increase exhaust enthalpy. Cold start emission diagnostic is executed during stable engine speed conditions. New converter light off strategies involve non-idle type conditions with spark retard for increasing exhaust enthalpy.

While current cold start emission diagnostic methods achieve their intended purpose, there is a need for a new and improved system and method to meet emissions regulations.

SUMMARY

According to several aspects, a method for cold start emissions diagnostic of a catalytic treatment device of an internal combustion engine includes determining a torque reserve; determining a catalyst light off (CLO) state; integrating the total torque reserve over a time period established by the CLO state; determining if a value from the integration exceeds an integration threshold; and if the value from the integration exceeds the integration threshold, indicating that the cold start emissions diagnostic is positive.

In an additional aspect of the present disclosure, if the value of the integration does not exceed the integration threshold, the cold start emissions diagnostic is negative.

In another aspect of the present disclosure, the method further includes determining a CLO enabled time period.

In another aspect of the present disclosure, the method further includes determining if the CLO enabled time period exceeds a minimum time threshold.

In another aspect of the present disclosure, if the CLO enable time period exceeds the minimum time threshold and if the value from the integration exceeds the integration threshold, the method further includes indicating that the cold start emissions diagnostic is positive.

In another aspect of the present disclosure, the method further includes determining if either the CLO enable time period does not exceed the minimum time threshold or if the value from the integration does not exceed the integration threshold.

In another aspect of the present disclosure, if the value from the integration does not exceed the integration threshold, the method further includes indicating that the cold start emissions diagnostic is negative.

In another aspect of the present disclosure, if the CLO enable time period exceeds the minimum time threshold, the method further includes indicating that the cold start emissions diagnostic is indeterminate.

According to several aspects, a method for cold start emissions diagnostic of a catalytic treatment device of an internal combustion engine includes determining a torque reserve; determining a catalyst light off (CLO) state; integrating the total torque reserve over a time period established by the CLO state; determining if a value from the integration exceeds an integration threshold; determining a CLO enabled time period; and if the CLO enable time period exceeds a minimum time threshold and if the value from the integration exceeds the integration threshold, indicating that the cold start emissions diagnostic is positive.

In an additional aspect of the present disclosure, the method further includes determining if either the CLO enable time period does not exceed the minimum time threshold or if the value from the integration does not exceed the integration threshold.

In another aspect of the present disclosure, if the value from the integration does not exceed the integration threshold, the method further includes indicating that the cold start emissions diagnostic is negative.

In another aspect of the present disclosure, if the CLO enable time period exceeds the minimum time threshold, the method further includes indicating that the cold start emissions diagnostic is indeterminate.

According to several aspects, a method for cold start emissions diagnostic of a catalytic treatment device of an internal combustion engine includes determining a torque reserve; determining a catalyst light off (CLO) state; integrating the total torque reserve over a time period established by the CLO state; determining if a value from the integration exceeds an integration threshold; determining a CLO enabled time period; and determining if the CLO enabled time period exceeds a minimum time threshold.

In an additional aspect of the present disclosure, if the value from the integration exceeds the integration threshold, the method further includes indicating that the cold start emissions diagnostic is positive, and if the value of the integration does not exceed the integration threshold, the method further includes indicating that the cold start emissions diagnostic is negative.

In another aspect of the present disclosure, if the CLO enable time period exceeds the minimum time threshold and if the value from the integration exceeds the integration threshold, the method further includes indicating that the cold start emissions diagnostic is positive.

In another aspect of the present disclosure, the method further includes determining if either the CLO enable time period does not exceed the minimum time threshold or if the value from the integration does not exceed the integration threshold.

In another aspect of the present disclosure, if the value from the integration does not exceed the integration threshold, the method further includes indicating that the cold start emissions diagnostic is negative.

In another aspect of the present disclosure, if the CLO enable time period exceeds the minimum time threshold, the method further includes indicating that the cold start emissions diagnostic is indeterminate.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
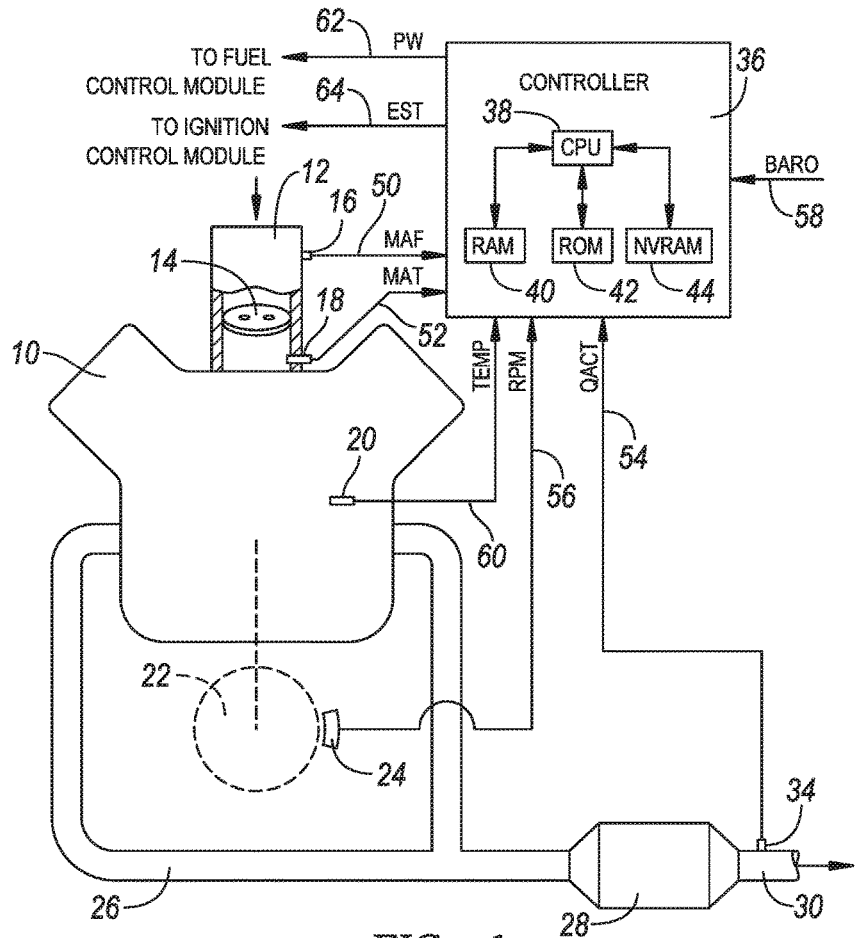
FIG. 1 is a schematic diagram of an engine and engine diagnostic hardware in accordance with the principles of the present invention.

Referring to FIG. 1, internal combustion engine 10 receives intake air through intake bore 12 in which conventional thick film or hot wire type mass airflow sensor 16 is disposed for transducing mass flow rate of intake air into signal MAF 50. Engine intake airflow may alternatively be determined through the generally understood speed-density approach. The intake air is metered through the bore 12 by manually or electronically controlled intake air valve of the butterfly or rotary type. Air temperature downstream of the intake air valve 14 (in an intake plenum or manifold) is transduced by thermocouple or thermistor 18 into output signal MAT 52. The intake plenum functions to distribute the intake air to a plurality of intake runners into which fuel is selectively injected forming an air-fuel mixture. Alternatively, fuel may be injected directly into engine cylinders. Each intake runner terminates at a valved engine cylinder intake port for timed admittance to an engine cylinder for combustion therein. The combustion products are guided out of the cylinders through an exhaust port which opens into an exhaust conduit 26. The exhaust conduit 26 terminates at an opening of a generally-available catalytic treatment device 28 for guiding the exhaust gas to the device 28 for treatment thereby, the treated engine exhaust gas passing out of the device 28 and through tailpipe 30 in which is disposed an exhaust gas sensor, such as a commercially-available calorimetric sensor 34 or hydrocarbon sensor for transducing concentration of combustibles (such as hydrocarbons HC) into sensor output signal Qact 54.

A conventional piston is received within each cylinder of the engine 10 and is reciprocally driven within the cylinder by the cylinder air-fuel mixture combustion reaction. Each piston is mechanically linked to an engine output shaft 22 whereby the reciprocal piston actuation rotationally drives the output shaft. Sensor 24 of the Hall effect or variable reluctance type is positioned in proximity to the output shaft 22 to transduce output shaft rotation into output signal RPM 56 having a frequency proportional to the rate of rotation of the output shaft 22 and having individual signal events indicating occurrence of engine events. Ambient barometric pressure is transduced external to the engine by conventional pressure transducer into output signal BARO 58.

Engine coolant is circulated through a conventional coolant circulation path in which is disposed a conventional temperature transducer 20 in the form of a thermocouple or thermistor for transducing the coolant temperature into output signal TEMP 60. The transducer output signals are received by conventional microcontroller 36 of a form generally understood in the art and including such well-known elements are a central processing unit CPU 38 having arithmetic logic circuitry for carrying out logic and arithmetic logic operations and control circuitry, and various memory devices including random access memory RAM 40, read only memory ROM 42, and non-volatile random access memory NVRAM 44.

The controller is activated upon manual application of ignition power thereto by an engine operator and, when activated, carries out a series of operations stored in an instruction-by-instruction format in ROM 42 for providing engine control, diagnostic and maintenance operations. Included in such operations are fuel control and ignition control operations for generating and issuing an engine fueling command in the form of a fuel injector pulse width PW 62 to a fuel control module (not shown) for driving at least one engine fuel injector to deliver fuel to the described cylinder intake runners for mixing with intake air, and for generating and issuing an ignition timing command EST 64 to an ignition control module for timed energization of spark plugs in active engine cylinders for igniting the air-fuel mixture. Any commercially-available fueling and ignition timing control operations may be used for generating and issuing the signals PW 62 and EST 64.

Figure 2:
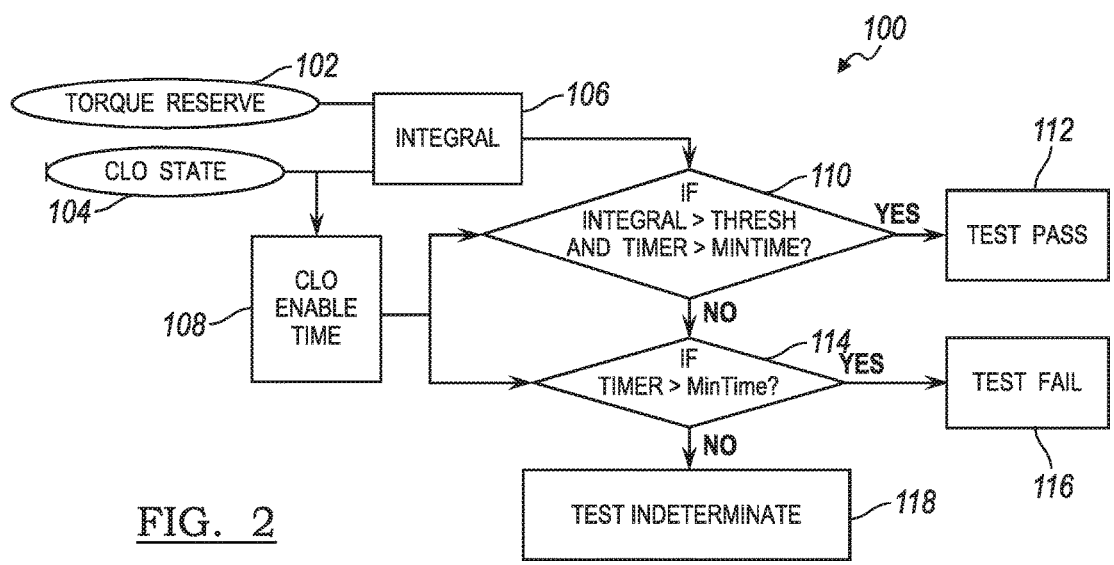
FIG. 2 is a flow diagram for cold start emissions diagnostic in accordance with the principles of the present invention.

In addition to various other diagnostic procedures that may be included in accordance with the principles of the present invention is the procedure 100 for cold start emissions diagnostic of the catalytic treatment device 28, as illustrated in FIG. 2. Generally, this procedure 100 provides for monitoring of the operability of the catalytic treatment device 28 (also referred to herein as the catalytic converter) at a time the converter should normally be reaching light-off and prior to a time at which the converter should be operating at its maximum efficiency, to ascertain whether the beneficial emissions reduction characteristic of light-off is reached in a timely manner so as to diagnose and therefore avoid an extended period of converter inactivity or low efficiency.

More specifically, such operations are initiated upon application of ignition power to a previously inactive controller 36 by the engine operator, such as by rotating an ignition cylinder to an "on" position, and proceed to carry out general initialization operations. Such initialization operations include operations for setting pointers, counters and flags to initial values, clearing of blocks of RAM 40, and transferring data from ROM locations 42 to RAM locations 40.

Following general initialization operations, an ignition cycle time marking the start time of the current ignition cycle is cleared and a catalytic converter diagnostic is enabled at a next step, such as by setting a diagnostic enable flag in RAM 40. Interrupts, including timer-based and event-based interrupts are next enabled to occur following pre-established timer events. The routine proceeds to reference from memory or sample from input signals, and process and store current values of controller input signals including signals RPM 56, TEMP 60, BARO 58, MAF 50, and MAT 52. Sampled signals are, if necessary, processed into representative values indicating engine speed, ambient barometric pressure, engine intake mass airflow, engine load, engine coolant temperature, and engine intake plenum air temperature for use in the current diagnostic operations or any other control or diagnostic operations. Such values are stored in RAM 40.

Turning now specifically to FIG. 2, the procedure 100 begins by obtaining a value for a torque reserve 102 and a state of the catalyst light off (CLO) state 104 (that is, the amount of spark retard). A time period to heat up the catalyst (that is, a CLO enable time) is determined in a step 108. Next, in a step 106, the torque reserve valve 102 is integrated over a time period established by the CLO state 104. A decision step 110 determines if the integrated value from the step 106 exceeds a predetermined threshold. If the decision is yes, the procedure 100 indicates that the cold start diagnostic is positive in a step 112.

Optionally, the decision step 110 also evaluates if the CLO enable time exceeds a minimum time threshold. If the integrated value 106 exceeds the predetermined threshold and if the CLO enabled time period exceeds the minimum time threshold, then the procedure 100 again indicates that the cold start diagnostic is positive 112.

If either criteria in the step 110 is not satisfied, the procedure 100 proceeds to a step 114, which determines if the CLO enabled time period exceeds the minimum time threshold. If step 114 determines that the CLO enabled time period exceeds the minimum time threshold, the procedure 100 indicates that the CLO diagnostic is negative (step 116). On the other hand, if step 114 determines that the CLO enabled time period does not exceed the minimum time threshold, the procedure 100 indicates in a step 118 that the CLO diagnostic is indeterminate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for cold start emissions diagnostic of a catalytic treatment device of an internal combustion engine, the method comprising:
   determining a torque;
   guiding internal combustion engine exhaust gas to the catalytic treatment device for treatment by the catalytic treatment device;
   providing an intake air temperature from a temperature sensor and concentration of combustibles of the exhaust gas from an exhaust gas sensor to a controller;
   evaluating the intake air temperature and the concentration of combustibles with the controller, the controller:
   determining a catalyst light off (CLO) state;
   integrating the total torque over a measured time period established by the CLO state;
   determining if a value from the integration exceeds an integration threshold; and
   indicating that the cold start emissions diagnostic is positive when the value from the integration exceeds the integration threshold.

2. The method of claim 1 wherein if the value of the integration does not exceed the integration threshold, the cold start emissions diagnostic is negative.

3. The method of claim 2 further comprising determining a CLO enabled time period.

4. The method of claim 3 further comprising determining if the CLO enabled time period exceeds a minimum time threshold.

5. The method of claim 4 wherein if the CLO enable time period exceeds the minimum time threshold and if the value from the integration exceeds the integration threshold, further comprising indicating that the cold start emissions diagnostic is positive.

6. The method of claim 5 further comprising determining if either the CLO enable time period does not exceed the minimum time threshold or if the value from the integration does not exceed the integration threshold.

7. The method of claim 6 wherein if the value from the integration does not exceed the integration threshold, further comprising indicating that the cold start emissions diagnostic is negative.

8. The method of claim 6 wherein if the CLO enable time period exceeds the minimum time threshold, further comprising indicating that the cold start emissions diagnostic is indeterminate.

9. A method for cold start emissions diagnostic of a catalytic treatment device of an internal combustion engine, the method comprising:
   determining a torque;
   guiding internal combustion engine exhaust gas to the catalytic treatment device for treatment by the catalytic treatment device;
   providing an intake air temperature from a temperature sensor and concentration of combustibles of the exhaust gas from an exhaust gas sensor to a controller;
   evaluating the intake air temperature and the concentration of combustibles with the controller, the controller:
   determining a catalyst light off (CLO) state;
   integrating the total torque over a measured time period established by the CLO state;
   determining if a value from the integration exceeds an integration threshold;
   determining a CLO enabled time period after the start of the engine; and
   indicating that the cold start emissions diagnostic is positive when the CLO enable time period exceeds a minimum time threshold and when the value from the integration exceeds the integration threshold.

10. The method of claim 9 further comprising determining if either the CLO enable time period does not exceed the minimum time threshold or if the value from the integration does not exceed the integration threshold.

11. The method of claim 10 wherein if the value from the integration does not exceed the integration threshold, further comprising indicating that the cold start emissions diagnostic is negative.

12. The method of claim 10 wherein if the CLO enable time period exceeds the minimum time threshold, further comprising indicating that the cold start emissions diagnostic is indeterminate.

13. A method for cold start emissions diagnostic of a catalytic treatment device of an internal combustion engine, the method comprising:
   determining a torque;
   guiding internal combustion engine exhaust gas to the catalytic treatment device for treatment by the catalytic treatment device;
   providing an intake air temperature from a temperature sensor and concentration of combustibles of the exhaust gas from an exhaust gas sensor to a controller;
   evaluating the intake air temperature and the concentration of combustibles with the controller, the controller:
   determining a catalyst light off (CLO) state;
   integrating the total torque over a measured time period established by the CLO state;
   determining if a value from the integration exceeds an integration threshold;

determining a CLO enabled time period after the start of the engine; and determining if the CLO enabled time period exceeds a minimum time threshold.

14. The method of claim 13 wherein if the value from the integration exceeds the integration threshold, further comprising indicating that the cold start emissions diagnostic is positive, and wherein if the value of the integration does not exceed the integration threshold, further comprising indicating that the cold start emissions diagnostic is negative.

15. The method of claim 13 wherein if the CLO enable time period exceeds the minimum time threshold and if the value from the integration exceeds the integration threshold, further comprising indicating that the cold start emissions diagnostic is positive.

16. The method of claim 15 further comprising determining if either the CLO enable time period does not exceed the minimum time threshold or if the value from the integration does not exceed the integration threshold.

17. The method of claim 16 wherein if the value from the integration does not exceed the integration threshold, further comprising indicating that the cold start emissions diagnostic is negative.

18. The method of claim 16 wherein if the CLO enable time period exceeds the minimum time threshold, further comprising indicating that the cold start emissions diagnostic is indeterminate.

* * * * *